United States Patent

Strobbe et al.

[11] Patent Number: 5,929,179
[45] Date of Patent: Jul. 27, 1999

[54] METHOD FOR PREVENTING FOULING IN POLYMERIZATION REACTORS

[75] Inventors: Guy Strobbe, Mol Wezel; Paul Allemeersch, Tessenderld; Edwin Vanheer, Hoeleden, all of Belgium

[73] Assignee: Borealis Polymers OY, Porvoo, Finland

[21] Appl. No.: 08/860,947

[22] PCT Filed: Jun. 21, 1997

[86] PCT No.: PCT/FI95/00696

§ 371 Date: Sep. 3, 1997

§ 102(e) Date: Sep. 3, 1997

[87] PCT Pub. No.: WO96/19503

PCT Pub. Date: Jun. 27, 1996

[30] Foreign Application Priority Data

Dec. 22, 1994 [FI] Finland ................................. 946025

[51] Int. Cl.⁶ .................................................. C08F 2/40
[52] U.S. Cl. ..................................... 526/64; 526/74
[58] Field of Search ................................ 526/64, 74

[56] References Cited

U.S. PATENT DOCUMENTS

| | | | |
|---|---|---|---|
| 3,956,252 | 5/1976 | Saeda et al. | 526/74 |
| 3,995,097 | 11/1976 | Brown et al. | 526/74 |
| 4,012,574 | 3/1977 | Jones et al. | 526/74 |
| 4,068,054 | 1/1978 | Willcox | 526/74 |
| 4,182,810 | 1/1980 | Willcox | 526/64 |
| 4,259,087 | 3/1981 | Naiman et al. | 44/62 |
| 5,026,795 | 6/1991 | Hogan | 526/74 |
| 5,283,278 | 2/1994 | Daire et al. | 524/399 |

FOREIGN PATENT DOCUMENTS 0107127  2/1984  European Pat. Off. ........ C08F 10/00

*Primary Examiner*—David W. Wu
*Attorney, Agent, or Firm*—Steinberg & Raskin, P.C.

[57] ABSTRACT

The invention relates to a method for preventing fouling in polymerization reactors, in particular in loop reactors, in which alpha-olefins are polymerized or copolymerized in particle form in the presence of catalysts. A mixture of alpha-olefin-acrylonitrile copolymers and polymeric polyamines is added into a reactor in order to prevent the fouling of the reactor.

15 Claims, 1 Drawing Sheet

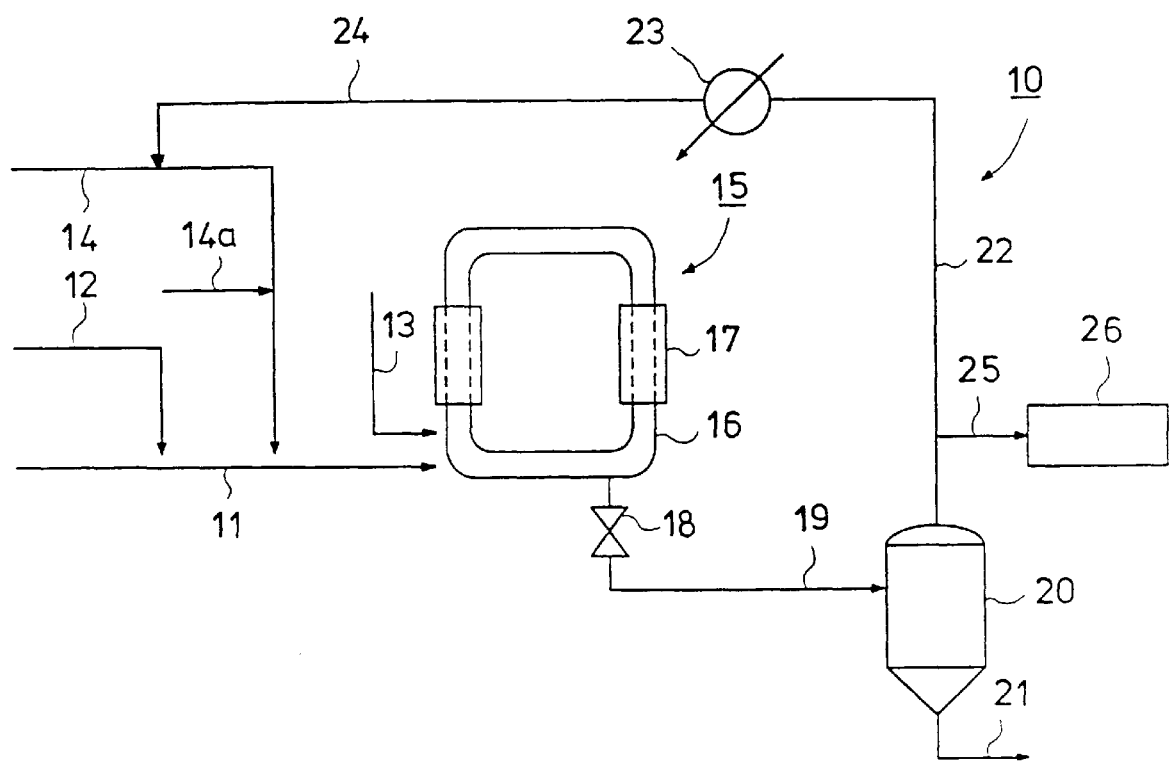

METHOD FOR PREVENTING FOULING IN POLYMERIZATION REACTORS

The invention concerns a method for preventing fouling in polymerization reactors, particularly in loop reactors.

BACKGROUND OF THE INVENTION

Various methods for manufacturing solid and semisolid polymers from hydrocarbons, for example, from 1-olefins have been developed. In one such method olefins, such as, ethylene, propylene, or butene are polymerized in the presence of catalysts in hydrocarbon diluents or with monomers themselves acting as diluents. The reactants are then kept in the liquid phase by maintaining a proper pressure in the polymerization reactor. When the polymer is insoluble or only slightly soluble in the diluent, the polymer product forms as particles and therefore the product flow consists of a suspension formed by polymer particles, diluents and monomers. This product flow is usually transferred to a polymer separation tank, where solids and liquid and gaseous constituents are separated from each other.

One reactor type applied in such methods is a continuous pipe reactor forming a loop, where the polymerization is carried out in a turbulent flow circulating in the loop. The product containing polymer, diluents and monomers is taken from the loop reactor either continuously or more usually periodically through a discharge valve and introduced into a separator, where the polymer is separated by lowering the pressure.

A problem frequently encountered especially in loop reactors is the adhering of the polymer particles to reactor walls. Even small polymer amounts cause that the smoothness of the inner face of the reactor disappears, whereafter the adhering accelerates and, in the worst case, causes the blocking of the reactor. A polymer layer on the inner face of the reactor increases essentially the flow resistance of the polymer suspension and the pumping power required. At the same time the heat transfer efficiency of the reactor decreases and makes the temperature control more difficult. If high polymerization temperatures are used, it may result in the melting of the polymer.

Further, the quality of the product is substantially impaired by polymer agglomerations which have stuck to the inner wall of a reactor and which come off it at some stage. The polymer material which has adhered and which comes off later has a different residence time and, hence, a different molecular weight from those of a material that has not stuck, whereupon a desired molecular structure is not achieved in the end product.

Attempts have been made to avoid the harmful fouling phenomenon described above by adding into diluent antistatic agents, which make the diluent more conductive and thereby prevent the formation of static electric charges at least to some extent. However, antistatic agents of that kind are usually harmful to the polymerization catalyst, because they act, at least to some extent, as catalyst poisons, thereby decreasing catalyst activity.

U.S. Pat. No. 3,956,252 proposes a nitrogen containing salt of phytic acid or a mixture of it with an alkali metal salt of an organic acid for an antistatic agent.

U.S. Pat. No. 3,995,097 proposes a mixture of an aluminum or chromium salt of an alkyl salicylic acid and an alkalimetal alkyl sulfosuccinate for an antistatic agent.

U.S. Pat. No. 4,012,574 proposes a surface-active compound, which contains one or more perfluorocarbon groups, for an antistatic agent.

U.S. Pat. No. 4,068,054 proposes a porphyrin compound either alone or together with a metal alkyl sulfosuccinate for an antistatic agent.

U.S. Pat. No. 4,182,810 proposes a mixture of a polysulphone polymer, a polymeric polyamine and an oil-soluble sulphonic acid for an antistatic agent.

The purpose of the invention is to provide a method for preventing the harmful fouling phenomenon in polymerization reactors. One object of the invention is to provide a method for preventing the harmful fouling phenomenon so that the catalyst activity does not essentially decrease. One further object of the invention is to provide a method for preventing the harmful fouling phenomenon so that the heat transfer of the polymerization reactor does not decrease essentially and so that there is provided a better residence time and molecular weight distribution of the polymer particles.

SUMMARY OF THE INVENTION

The objects of the invention are achieved by using a composition of an alpha-olefin-acrylonitrile copolymer and a polymeric polyamine to prevent the harmful fouling phenomenon in a polymerization reactor, particularly in a loop reactor.

The compositions formed by alpha-olefin-acrylonitrile copolymers and polymeric polyamines are as such known and so is the application of them as antistatic agents. Thus, for example, according to U.S. Pat. No. 4,259,087 these substances are used in small amounts to reduce ignition and explosion hazards in hydrocarbon fuels due to electrostatic charges. Other uses proposed in this patent are solvents, stain removers, textiles, pigments, liquid polishing agents and rubber compositions.

According to the invention it has been surprisingly found out that by using these compositions it is possible to effectively prevent polymer particles from adhering to the inner face of the reactor and at the same time to avoid the harmful effect which the agents conventionally used for the corresponding purpose have on catalyst activity. The amount of the composition may also be varied considerably without an adverse effect on the properties of the product.

The fouling preventive agents applied in the invention consist of a composition which contains alpha-olefin-acrylonitrile copolymer and polyamine. Said copolymers can be manufactured, as disclosed in U.S. Pat. No. 4,259,087, by complexing, in a manner known per se, acrylonitrile with a Lewis-acid, such as, $AlCl_3$, $ZnCl_2$ and $AlR_nCl_{3-n}$ and by polymerizing the complex material obtained with a terminal olefin with the aid of a free radical initiator. Suitable alpha-olefins are, for example, 1-hexene, 1-octene, 1-decene, 1-dodecene, tetradecene, 1-hexadecene and eicosene.

Polyamine components can also be prepared in a way known in itself, for example, by polymerizing aliphatic primary mono- or diamines with epichlorhydrin or an alpha-olefin-maleic acid anhydride copolymer.

Generally the ratio of the alpha-olefin-acrylonitrile copolymer to the polyamine component can vary within wide limits, for example, from 1:99 to 99:1, preferably from 25:75 to 75:25.

The amount of the adhesion prevention agent used according to the invention can be varied from 0.001 to 3 g/g catalyst, preferably from 0.01 to 0.7 g/g catalyst. Especially, it is to be noted that the amount of the adhesion prevention agent used according to the invention can be exceptionally high without a simultaneous harmful effect on catalyst activity.

The fouling prevention agent according to the invention can be added before the reactor into some feed flow passed into the reactor or straight to the reactor. Thus, it can be added into the diluent passed into the reactor or into the monomer flow fed into the reactor or into the diluent used for feeding the catalyst. The addition can be carried out either continuously or periodically or only when required.

According to the invention, the fouling prevention agent can be applied especially in the polymerization of alpha-olefins, such as, ethylene, propylene, butene, 4-methyl-1-pentene or hexene either in liquid phase or gas phase processes. Most preferably it is applied in ethylene, propylene or butene polymerizations or copolymerizations in a loop reactor. Especially, the adhesion prevention agent according to the invention is applied when catalysts susceptible to being poisoned are used in polymerization, such as, Phillips-type catalysts or Ziegler catalysts.

For example, Phillips-type catalysts can thus be used as a catalyst, said catalysts being composed of chromium oxide supported on an inorganic carrier, such as, silica, alumina and zirconia. Ziegler-Natta catalysts are generally composed of one or more transition metals belonging to groups IV–VI of the Periodic Table, such as, titanium, vanadium, zirconium or chromium, and of organometallic compounds of metals belonging to groups I–III of the Periodic Table.

Temperatures of 40–110° C. and pressures of 1–100 bar are generally applied in polymerization. The polymerization reactor can be a conventional reactor of the stirred tank type or a pipe reactor, preferably a loop reactor or a gas-phase reactor. The polymerization can be carried out as a batch process, but the advantages of the fouling prevention agent according to the invention become especially apparent in a continuous process, where the problems caused by the adhering of polymer particles are more evident.

In the suspension polymerization aliphatic hydrocarbons, such as, propane, butane, pentane, hexane, heptane or octene, can be used as a diluent, although the use of the fouling preventive agent according to the invention is by no means limited only to the examples listed.

BRIEF DESCRIPTION OF THE DRAWING

FIG. 1 depicts a conventional loop reactor system.

DETAILED DESCRIPTION OF THE INVENTION

The invention is explained in detail by referring to the figure of the attached drawing, which shows diagrammatically a conventional loop reactor system.

In the figure reference numeral 10 denotes a polymerization apparatus, in which into a loop reactor 15 are introduced a monomer via a feed line 11 from line 12, a catalyst from line 13 and a diluent from line 14. The suspension formed by the reactants and the forming polymer is circulated in a pipe 16 of the reactor 15 at a high velocity by means of a circulation device (not shown), for example, a pump. The temperature of the reactor 15 can be regulated with a heating/cooling jacket 17. The feed system of the reactants described above is only illustrative and thus the reactants can be introduced into the reactor 15 in any way desired either together or separately.

A suspension of polymer, diluent and monomer is discharged from the reactor 15 via valve 18. The valve 18 opens periodically for a short period, for example, every half minute and allows the product suspension to flow via pipe 19 to a separation tank 20. Due to a pressure decrease in the separation tank 20 the diluent contained in the suspension gasifies, whereupon the solid polymer product discharges via pipe 21 and the gaseous phase containing the diluent and the monomer is removed via pipe 22 and it can be returned into the reactor 15 via pipe 24 after an increase of pressure carried out in a compressor 23. Gas samples can be taken from pipe 22 via pipe 25 for an analyzer 26.

According to the invention, a composition of alpha-olefin-acrylonitrile copolymer and polymeric polyamine is passed for example from line 14a into the diluent flow 14 and further into the loop reactor 15. However, the invention is by no means critical as to the point where the composition acting as an antistatic agent is added into the reactor 15. The composition can thus be added equally well, for instance, via line 13.

In the following the invention is illustrated by the accompanying examples, in which the following commercial products were used as fouling prevention agents:

TOLAD 511 a composition of alpha-olefin-acrylonitrile copolymer and polymeric polyamine, manufactured by Petrolite Corporation, ASA 3, manufactured by Shell

EXAMPLE 1

A homopolymerization of ethylene was carried out in a bench scale slurry reactor of 3 l by using an isobutane diluent and a chromium acetyl acetonate catalyst supported on a silica carrier. TOLAD 511 was used as a fouling prevention agent. The polymerization conditions and the results are presented in the following Table.

| Fouling prevention agent g/g catalyst | 0 | 0.015 | 0.030 | 0 |
|---|---|---|---|---|
| Catalyst activity kg polymer/g cat | 5.6 | 5.8 | 5.1 | 4.8 |
| Melt index MFR 21 (HLMI) (g/10 min) | 18 | 15 | 17 | 18 |
| Reactor temperature (° C.) | 105.0 | 105.0 | 105.0 | 105.0 |
| Reactor pressure (bar) | 40 | 40 | 40 | 40 |

The addition of the fouling prevention agent did not affect the melt index of the polymer nor the activity of the catalyst.

EXAMPLE 2

A copolymer of ethylene and 1-hexene was produced on an industrial scale in a loop reactor of 86 m³ by using a chromium acetonate catalyst supported on a silica carrier. ASA-3 was used as a fouling prevention agent. During the polymerization the additive was gradually replaced with the additive (Tolad 511) according to the invention. The electrostatic potential of the polymer powder produced otherwise in prevailing constant conditions dropped from the value of −4.3 to the value of −0.9 while the catalyst activity increased from the value of 2.9 to the value of 3.6 kg/g catalyst. This demonstrates the efficiency of the additive according to the invention and that it has no poisoning action on catalysts.

EXAMPLE 3

The polymerization of Example 2 was repeated by using the agent (Tolad 511) of the invention as a fouling prevention agent. The additive of the invention was suddenly replaced with the other additive (ASA-3). The catalyst activity dropped dramatically and almost extinguished the polymerization reaction.

EXAMPLE 4

A copolymer of ethylene and 1-hexene was produced on an industrial scale in a loop reactor of 86 m³ by using a fluorinated chromium catalyst on a silica carrier. A multiple regression analysis demonstrated that, in order to produce an identical product under otherwise the same conditions, the required reactor temperature is 1.2° C. higher when using the additive (Tolad 511) according to the invention instead of the other additive (ASA-3). Although, according to general knowledge, this should have led to the fouling of the reactor walls, no sign of the fouling phenomenon, such as, an increase in the reactor pump power or reactor temperature fluctuations, was noticed.

EXAMPLE 5

A loop reactor of 500 dm³ was operated at 104° C. by feeding continuously 32 kg/h isobutane, 4 g/h polymerization catalyst containing 0.98% chromium as an active metal, and ethylene so that its content in the liquid phase was 7.5% by mole. To prevent fouling, a solution of Tolad 511 in isobutane was continuously added into the reactor. The amount of the additive was 11 g/h of pure Tolad. Polyethylene was withdrawn continuously from the reactor at a rate of 43 kg/h, which is normal for the catalyst used and shows that the catalyst was not poisoned in spite of a very large amount of the fouling preventive agent. No fouling of the reactor was observed and the polymer was free of static electricity. $MFR_2$ of the polymer was 0.26 g/10 min and $MFR_{21}$ was 29.4 g/10 min.

EXAMPLE 6

A loop reactor having a volume of 500 dm³ was operated at 95° C. by feeding continuously 24 kg/h propane, 30 g/h polymerization catalyst containing 3% titanium as an active metal, ethylene so that its content in the liquid phase was 7.0% by mole, and hydrogen so that its ratio to ethylene was 518 mol/kmol. To prevent fouling, a solution of Tolad 511 in propane was continuously added into the reactor. The amount of the additive was 78 mg/h of pure Tolad. Polyethylene was withdrawn continuously from the reactor at a rate of 30 kg/h, which was a normal value for the catalyst used and shows that the catalyst was not poisoned. No fouling of the reactor was observed and the polymer was free of static electricity. $MFR_2$ of the polymer was 400 g/10 min.

EXAMPLE 7

A first loop reactor having a volume of 50 dm³ was operated at 70° C. by feeding continuously 29 kg/h propane, 11 g/h polymerization catalyst containing 2.6% titanium as an active metal, 1.1 kg/h ethylene, 50 g/h 1-butene and hydrogen so that its ratio to ethylene in the reactor was 175 mol/kmol. To prevent fouling, a solution of Tolad 511 in propane was continuously added into the reactor, calculated as 570 mg of pure Tolad per hour.

The polymer slurry was continuously fed into a second loop reactor having a volume of 500 dm³ and operated at 95° C. In addition to the polymer slurry from the first loop reactor, into the second loop reactor were continuously fed 32 kg/h propane and ethylene so that its content remained at 7.5% by mole and hydrogen so that its ratio to ethylene was 214 mol/kmol. Polyethylene having a $MFR_2$ of 115 g/10 min was withdrawn continuously from the reactor at a rate of 32 kg/h. The samples taken of the polymer powder were practically free of static electricity.

Then, a disturbance happened in the Tolad pump, resulting in a loss of the feed. The polymer samples taken from the reactor during two hours exhibited significant static electricity. The polymerization rate did not increase but remained at the value of 32 kg/h. The problem in the feed pump was corrected and during two hours the static electricity in the polymer samples decreased and finally disappeared.

We claim:

1. A method for preventing fouling in loop reactors, in which alpha-olefins are polymerized or copolymerized in particle form in the presence of catalysts, characterized in that a composition of alpha-olefin-acrylonitrile copolymers and polymeric polyamines is added into the reactor in order to prevent fouling of the loop reactor.

2. A method according to claim 1, wherein said polyamine is a polymerization product of an aliphatic primary mono- or diamine with epichlorohydrin or an alpha-olefin-maleic anhydride copolymer.

3. A method according to claim 1, characterized in that the ratio of the alpha-olefin-acrylonitrile copolymer to the polyamine component is from 1:99 to 99:1.

4. A method according to claim 1, characterized in that the amount of said composition is 0.001–3 g/g catalyst.

5. A method according to claim 1, characterized in that said alpha-olefin polymerized in said reactor is selected from the group of ethylene, propylene, 1-butene, 1-hexene, and mixtures thereof.

6. A method according to claim 1 wherein the ratio of the alpha-olefin acrylonitrile copolymer to the polyamine component is from 25:75 to 75:25.

7. A method according to claim 1, wherein the amount of said composition is 0.01 to 0.7 g/g catalyst.

8. A method of preventing fouling in loop reactors, said method comprising:
   (a) polymerizing or copolymerizing alpha-olefins in particle form in a loop reactor; and
   (b) adding a composition comprising alpha-olefin acrylonitrile copolymers and polymeric polyamines into said loop reactor.

9. The method of claim 8 wherein said step of adding said composition occurs continuously.

10. The method of claim 8, wherein said polyamine is a polymerization product of an aliphatic primary mono- or di-amine with epichlorohydrine or an alpha-olefin maleic anhydride copolymer.

11. The method of claim 8, wherein said composition comprises a ratio of from 1:99 to 99:1 alpha-olefin acrylonitrile copolymer to polyamine.

12. The method of claim 11, wherein said ratio is from 25:75 to 75:25 alpha-olefin acrylonitrile to polyamine.

13. The method of claim 8, wherein said composition comprises 0.001 to 3 g/g catalyst.

14. The method of claim 13, wherein said composition comprises 0.01 to 0.7 g/g catalyst.

15. The method of claim 8, wherein said alpha-olefin in step (a) is selected from the group consisting of ethylene, propylene, 1-butene, 1-hexene, and mixtures thereof.

* * * * *